Figure 1:
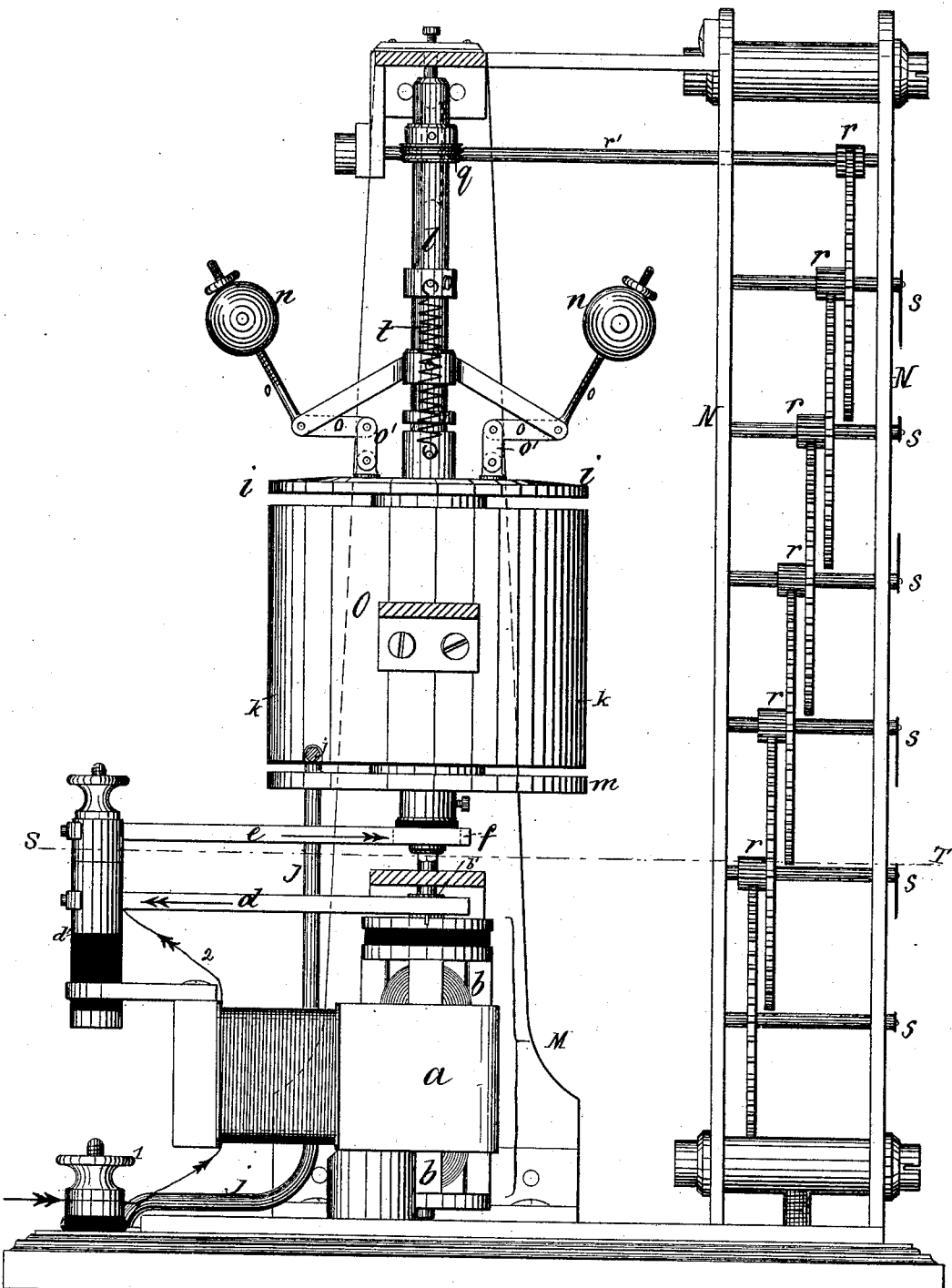

(No Model.) 6 Sheets—Sheet 1.

J. HOPKINSON.
APPARATUS FOR MEASURING AND RECORDING ELECTRIC CURRENTS.

No. 277,731. Patented May 15, 1883.

Witnesses:
H. Turner.
James F. Tobin.

Inventor:
John Hopkinson
by his attorneys
Howson and Son (No Model.) 6 Sheets—Sheet 2.

J. HOPKINSON.
APPARATUS FOR MEASURING AND RECORDING ELECTRIC CURRENTS.

No. 277,731. Patented May 15, 1883.

(No Model.)  6 Sheets—Sheet 4.

J. HOPKINSON.
APPARATUS FOR MEASURING AND RECORDING ELECTRIC CURRENTS.

No. 277,731. Patented May 15, 1883.

(No Model.) 6 Sheets—Sheet 5.
J. HOPKINSON.
APPARATUS FOR MEASURING AND RECORDING ELECTRIC CURRENTS.
No. 277,731. Patented May 15, 1883.
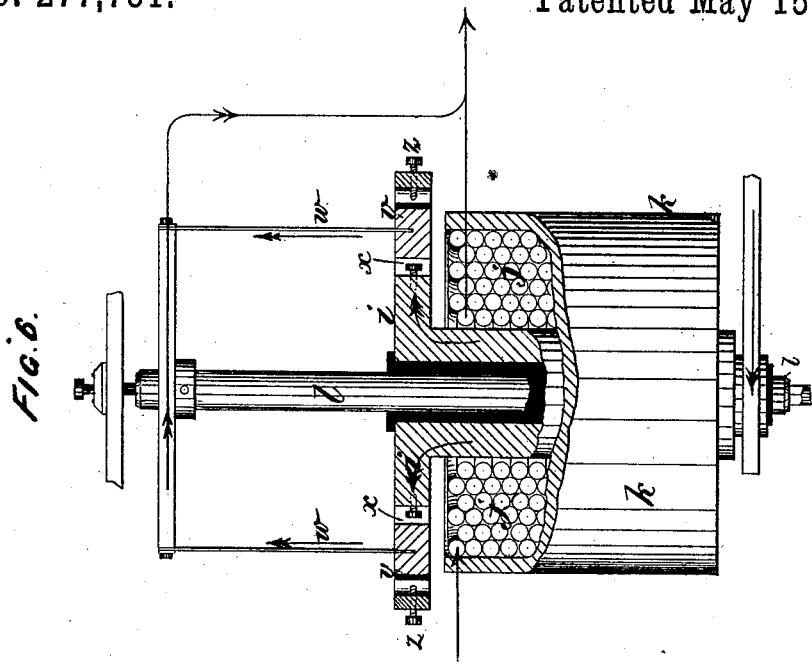
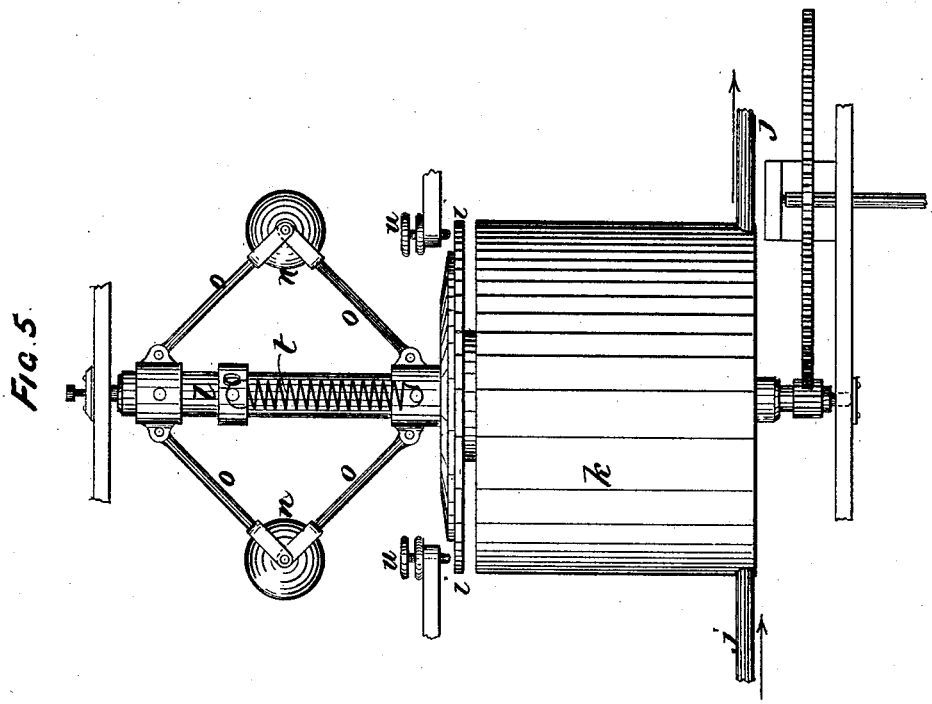

(No Model.) 6 Sheets—Sheet 6.
J. HOPKINSON.
APPARATUS FOR MEASURING AND RECORDING ELECTRIC CURRENTS.
No. 277,731. Patented May 15, 1883.
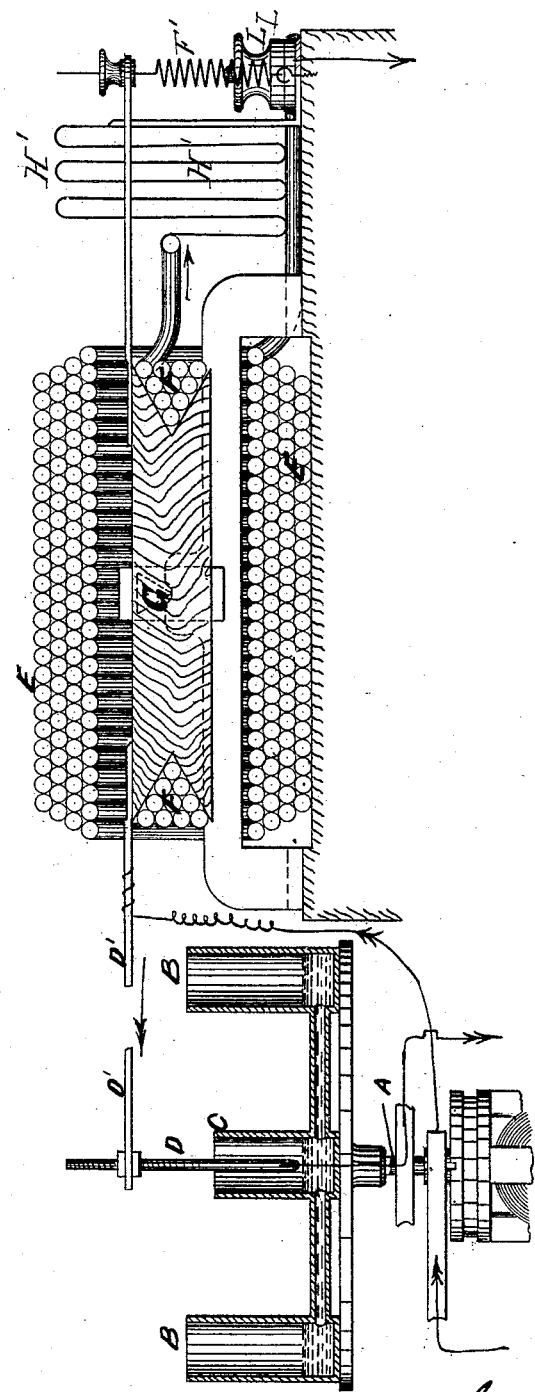

UNITED STATES PATENT OFFICE.

JOHN HOPKINSON, OF WESTMINSTER CHAMBERS, COUNTY OF MIDDLESEX, ENGLAND.

APPARATUS FOR MEASURING AND RECORDING ELECTRIC CURRENTS.

SPECIFICATION forming part of Letters Patent No. 277,731, dated May 15, 1883.

Application filed July 31, 1882. (No model.) Patented in England January 4, 1882, No. 49.

*To all whom it may concern:*

Be it known that I, JOHN HOPKINSON, a subject of the Queen of Great Britain, and residing at Westminster Chambers, county of Middlesex, England, have invented certain Improvements in Apparatus for Measuring and Recording Quantity of Electricity, and in the means or apparatus employed therefor, (for which I have obtained a patent in Great Britain, No. 49, dated January 4, 1882,) of which the following is a specification.

My improvements relate to means for measuring the whole quantity of electricity which passes through a conductor. For this purpose I make use of a centrifugal governor or centrifugal apparatus, and control its velocity by electrical or electro-magnetic apparatus. The centrifugal force of the governor may be opposed by the attraction or repulsion of one conductor conveying electricity on another conductor conveying electricity, of an electro-magnet for its armature, or of a solenoid for its core; or the centrifugal force may move one contact-piece or its equivalent and the electrical apparatus a second contact-piece in such wise that as the speed of the governor increases the former piece or its equivalent is moved from the second, while as the electrical force increases the second piece follows up the first. When the centrifugal force is mechanically opposed to the electrical force, the governor may act by bringing a friction-brake into action; or it may act by making and breaking an electrical contact. The governor may be driven by a small electric motor; or in the case of using a brake the governor may be driven by clock-work. In order to prevent the force due to the electro-magnet or its equivalent from putting undue pressure on the bearings of the centrifugal governor, I find it advantageous to arrange the electro-magnet symmetrically about the axis of the governor. When the governor and electro-magnet or its equivalent carry electrical contact-pieces, the ordinary mechanism of the governor may be replaced by a heavy fluid—such as mercury—the surface of the mercury being one of the movable contacts. The electro-magnet or its equivalent wire may either carry the whole current to be measured or may be in a shunt carrying part only of that current. The number of revolutions of the governor may be counted and recorded by clock-work or other suitable mechanism.

Figure 2:
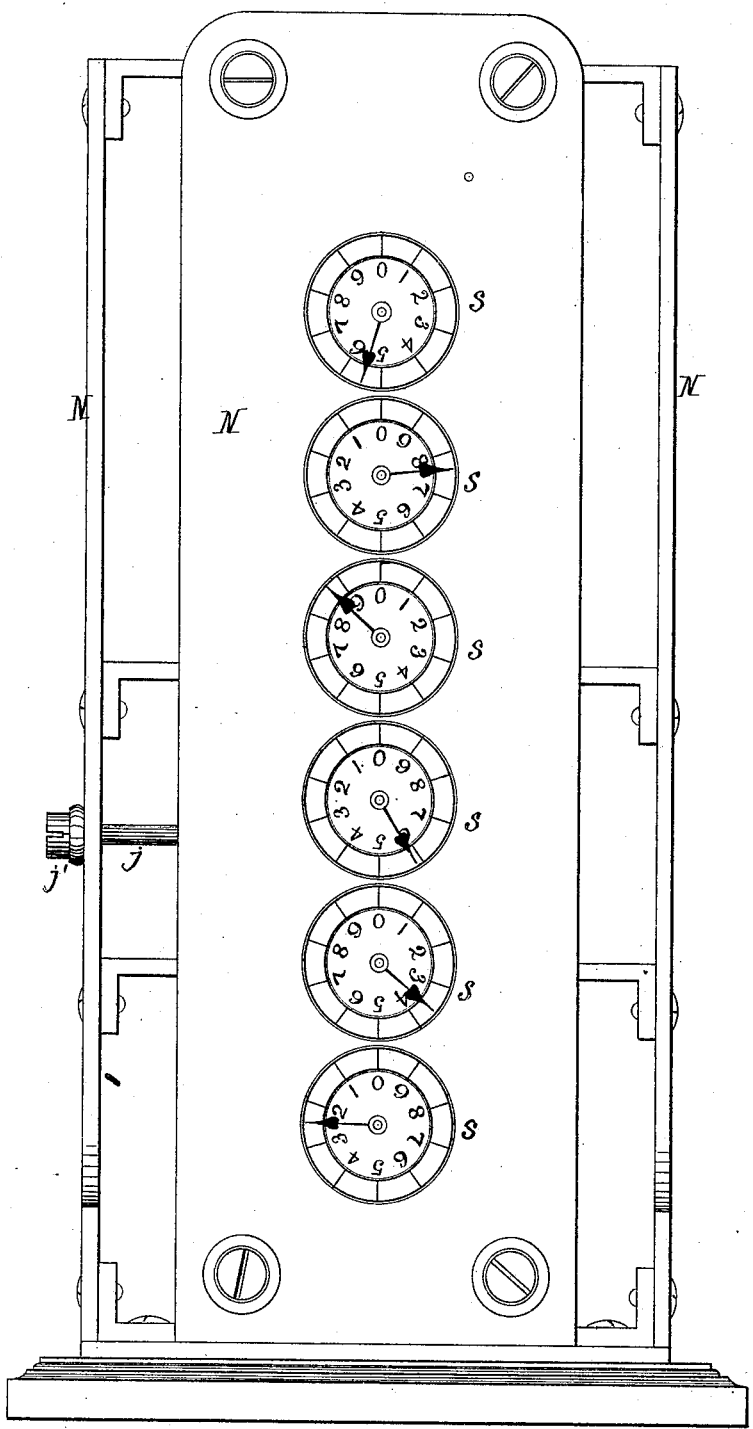
Figure 3:
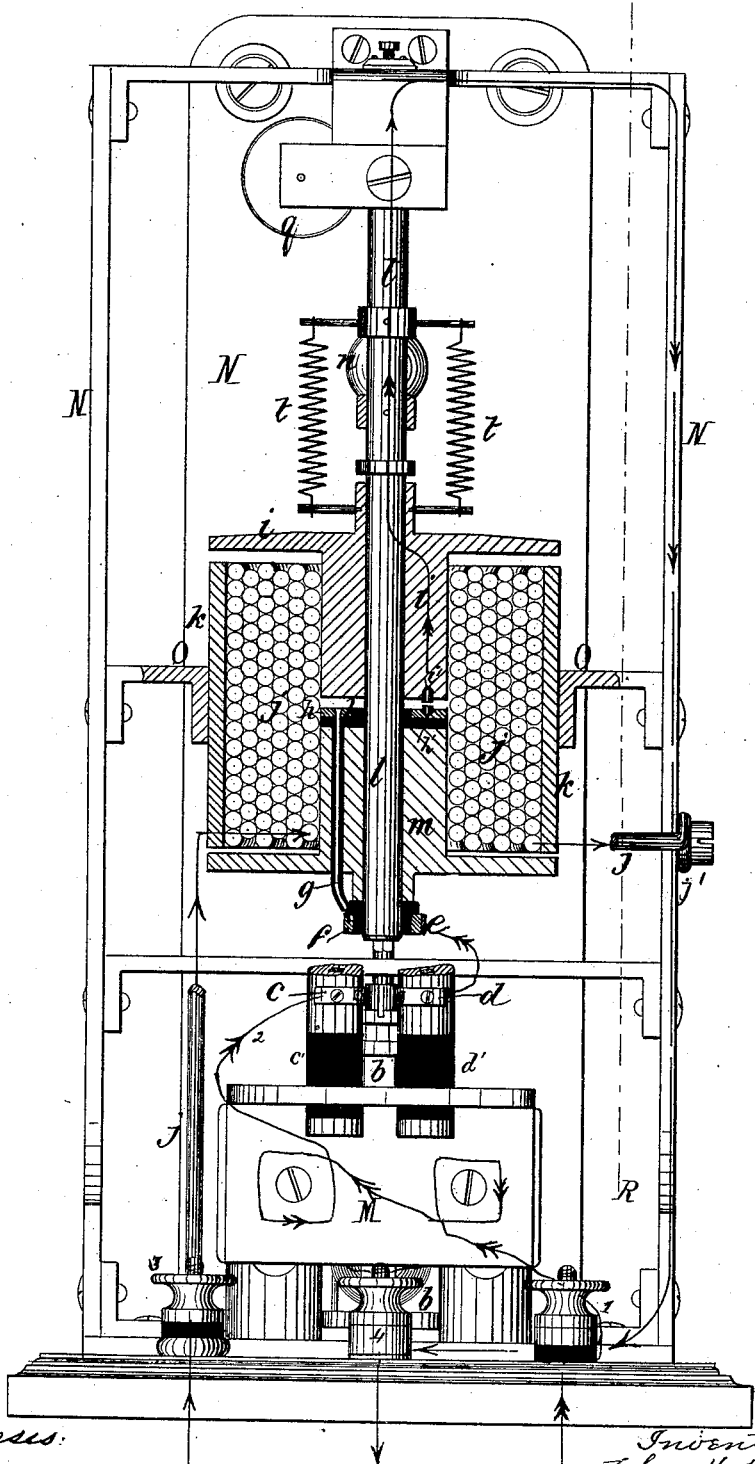
Figure 4:
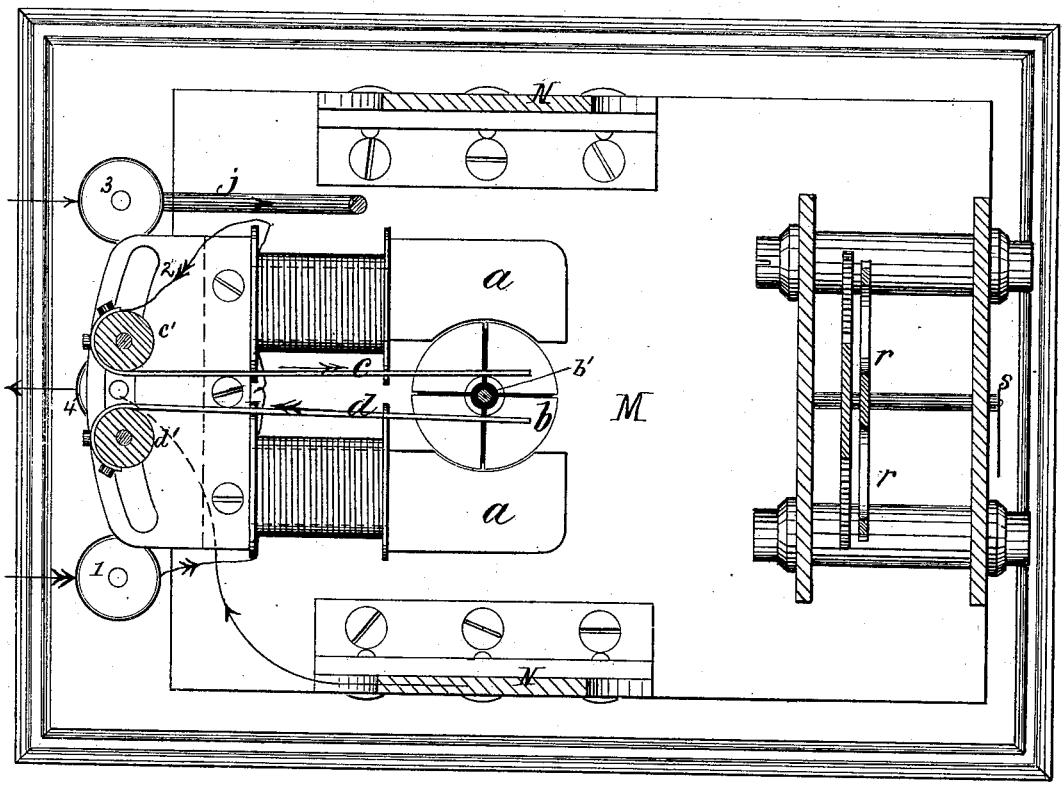

In the accompanying drawings, Figure 1, Sheet 1, is a side view of my electric meter, partly in section, on the line Q R, Fig. 3. Fig. 2, Sheet 2, is a face view; Fig. 3, Sheet 3, a rear view, partly in section; and Fig. 4, Sheet 4, a sectional plan on the line S T, Fig. 1; Figs. 5 and 6, Sheet 5, views of modifications; and Fig. 7, Sheet 6, and Fig. 8, Sheet 4, views of another modification.

Referring to the meter shown in Figs. 1, 2, 3, and 4, N is the frame of the apparatus, which preferably carries a number of registering-dials, $s$, operated by suitable multiplying-gear, $r$, to which motion is communicated from the operative parts of the meter, as more fully described hereinafter.

At the lower part of the frame is arranged an electric motor, M, the coils of whose electro-magnets $a\ a$ are in a shunt-circuit from the main circuit the current in which is to be measured, the shunt-circuit being represented by the double-headed arrows. This motor M is arranged so that the axis of its rotating armature $b$, mounted in suitable bearings, will be vertical, and the upper end of this axis is coupled to or forms part of a shaft, $l$. To this shaft $l$ is secured the half-core $m$ of the electro-magnet O, whose coils $j\ j$ in the main circuit (indicated by the single-headed arrows) are carried by a stationary tube, $k$, secured to the frame. A second half-core, $i$, is also carried by the shaft $l$, so as to rotate therewith, but being free to slide thereon longitudinally to an extent limited in an upper direction by a shoulder on the shaft, and in a downward direction by a platinum or similar pin, $i'$, coming into contact with a corresponding pin, $h'$, carried by an insulated ring, $h$, on the top of the core $m$. This ring $h$ is connected by an insulated conductor, $g$, with an insulated ring, $f$, on the lower end of the shaft $l$. On this ring bears a brush, $e$, secured to one of the insulated posts $c'\ d'$, carrying the commutator-brushes $c\ d$, which bear on the commutator $b'$ of the armature of the motor. The plate carrying these posts $c'\ d'$ is provided with curved slots to permit the brushes to be adjusted in reference to the commutator-plates.

To balance the movable core $i$ of the electro-magnet O, and govern its action, the said core is suspended by links $o'$ from the short arms of bent levers $o$, pivoted to arms on the rotating shaft $l$ and carrying governor-balls $n$. Springs $t$ are also preferably employed to balance the core $i$. The upper end of the shaft $l$ is provided with a worm, $q$, gearing into a worm-wheel on a shaft, $r'$, which thus transmits the motion of the shaft $l$ to the registering devices $r\ s$, above referred to.

The shunt-circuit for operating the motor enters, as indicated by the double-headed arrows, at the insulated post 1, thence to the fine-wire coils of the electro-magnets $a$, conductor 2, brush $c$, armature $b$, brush $d$, brush $e$, ring $f$, conductor $g$, ring $h$, points $h'\ i'$, and thence to the frame and out at post 4. The main circuit (indicated by single-headed arrows) enters at insulated post 3, passes through the coarse-wire coils $j$ of the electro-magnet O, thence to the frame at $j'$, Fig. 3, and out at 4.

The weights $n$ of the governor and the tension of the spring $t$ are so adjusted that when there is no current passing through the coils the core $i$ will be in a raised position, with the points $h'$ and $i'$ out of contact, and there will be no circuit through the coils of the electric motor, and the armature $b$ will consequently remain stationary; but when the current begins to flow through the coil it causes attraction between the fixed tube $k$ and the flange of the core $i$, which extends to the periphery of said tube, and also between the two cores $m$ and $i$, so that the latter is drawn downward, and the points $h'$ and $i'$ brought together to close the shunt-circuit through the coils of the motor, and cause the armature of the latter to revolve, and with it the shaft $l$ and cores $m$ and $i$, with the governor devices. As these revolve, the centrifugal force on the governor-balls tends to lift the core $i$ in opposition to the magnetic attraction, and this centrifugal force is proportional to the square of the speed of revolution, while the magnetic force is proportional, within certain limits, to the square of the current in the coil. This proportionality is not absolutely accurate; but so long as the rim of the core and cylinder are not nearly saturated it is found to be sufficiently nearly so for practical purposes. These forces should exactly counterbalance each other, for if at any instant the speed be too great the core $i$ will be raised and the circuit through the coils of the motor broken, and the speed will be reduced, owing to friction of the bearings and other parts of the mechanism, while if the speed be too low the contact at $h'\ i'$ will be made, and a current will pass through the motor, which will increase the speed of the system until the centrifugal force overbalances the electro-magnetic attraction, and again breaks the contact at $h'\ i'$. The result is that the shaft $l$ will revolve with an average velocity proportional to the current passing through the coil $j$ in the main circuit. By arranging the shaft $l$ centrally within the solenoid there will be no undue pressure on the bearings arising from electro-magnetic effects on said shaft.

The core $i$ may be connected to the shaft $l$ through the medium of groove and feather; but for ordinary purposes the connection of the levers $o$ and links $o'$ will keep the core from turning independently of the shaft.

The operation of the meter is not dependent for its accuracy upon the power of the motor, for if the motor be more powerful the contact at $h'\ i'$ will have a shorter duration; but the average speed of revolution will remain the same for a given current in the solenoid. The capacity of the meter, or the greatest current it will register, is, however, limited by the maximum speed of the motor, as well as by the limit of magnetization of the cores of the solenoid, for when the maximum is surpassed the speed can never become sufficient to cause the governor-balls to fly out. The theory may be stated algebraically thus: Let C be the current in the solenoid; F, the attractive force of the fixed part of the core and of the iron cylinder on the movable part of the core which is suspended from the governor; let $n$ be the number of revolutions per minute made by the governor, and G the tension of the links $o'$ in excess of the tension in them when the instrument is at rest. Then, if the rim be not near saturation, $F = aC^2$ nearly when $a$ is constant; also, $G = bn^2$ when $b$ is constant. Now, if $G > F$, the core $i$ will be raised a little, its further rise being stopped by a collar on the shaft, and the contact will be broken at $h'\ i'$. If $G < F$, the core will be pulled down and contact made at $h'\ i'$; hence, if $aC^2 < bn^2$, there will be no contact at $h'\ i'$, and the machine will be retarded. If $aC^2 > bn^2$, there will be contact at $h'\ i'$, and the machine will be accelerated. The result is that $aC^2$ is always very nearly equal to $bn^2$, being alternately a little greater and a little less; hence, taking the average value of $n^2$, we have with practical accuracy $aC^2 = bn^2$, and therefore $n$ proportional to C.

In the modification shown in Fig. 5 the solenoid, shaft $l$, and cores are similar to those described, and the governor devices for the core $i$, although slightly different from those shown in the preceding figures, will be readily understood without description. In this case, however, instead of driving the shaft $l$ by an electric motor, and controlling the speed by making and breaking the shunt-circuit through the motor, the shaft is driven by suitable clockwork, and the speed is regulated by the flange of the core $i$ coming into contact with friction-screws $u\ u$, carried by a fixed part of the frame. Therefore, when there is a decrease of current in the solenoid, and a consequent elevation of the core $i$, the flange of the latter will rise into contact with the said screws, which will act as friction-brakes to proportionately decrease the speed of the shaft $l$. The theory of operation is very similar to that of the instrument above described. A very small upward pressure against the brake-screws causes much friction and maintains a close approximation to proportionality of centrifugal force and magnetic attraction.

In the modification shown in Fig. 6 the shaft $l$ is intended to be driven by an electric motor in the shunt-circuit, as in the device shown in Figs. 1, 2, 3, and 4, and the speed regulated by the making and breaking, at $x\,x$, of the shunt-circuit, which, as before, is indicated by the double-headed arrows. The core $i$ is in this case fixed to the shaft, but insulated therefrom, and in the enlarged flange of the core are formed radial slots for the reception of small blocks $v$, which are carried by flat pendent springs $w$, suspended from the cross-head $a$. The inner sides of the weights or blocks $v$ make contact with the adjustable screws $x\,x$; but the blocks are insulated on their outer sides, so as not to make electrical contact with the adjustable stops $z\,z$, which are simply to prevent the pieces $v$ from flying out too far under the centrifugal force. They are attracted inward by the magnetism of the core $i$. The core $i$ is connected with the shunt-circuit by a brush-contact similar to that shown at $e$, in Fig. 1.

The theory of the operation is similar to the first case. If the attraction of the core $i$ for the armatures $v$ is greater than the centrifugal force, contact will occur between $x$ and $v$, a current will pass through the motor which drives the system, and there will be an increased speed until the centrifugal force is greater than the magnetic attraction, when the pieces $v\,v$ will fly out and break the contact at $x$, and there will be thereupon a retardation until the velocity falls to a point at which the attraction is greater than the centrifugal force. Instead of constructing the apparatus so as to counterbalance the centrifugal force against the electro-magnetic force, as above described, the centrifugal devices may be provided with one contact-piece and the electrical apparatus with another contact-piece, so that as the speed of the centrifugal governor increases, the contact-piece on the governor is moved away from the other, while as the electrical force increases, the contact on the electrical device follows up the contact on the governor.

Figure 8:
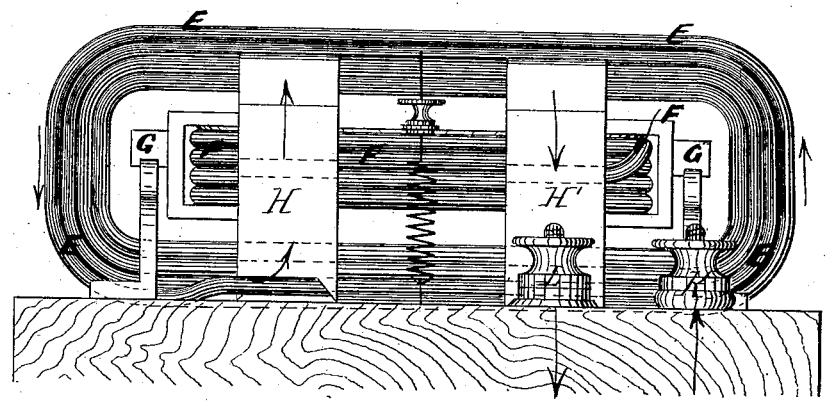

The modification shown in Figs. 7 and 8 illustrates a method of carrying this into effect. In these figures, A is a shaft driven like the shaft $l$, above described, by an electric motor, and carrying three vertical tubes, B, B, and C, communicating with each other, one tube, C, being in line with the axis, and the others, B, being at a distance radially from the center of the shaft. These communicating tubes contain mercury, so that when the shaft with the tubes, is revolved, the mercury, owing to the centrifugal force, will rise in the outer tubes, B, and fall correspondingly in the central tube. Within the central tube dips a pendent contact-finger, D, carried by an arm, D', secured to a pivoted coil, F. This coil F is mounted on knife-edge bearings within a stationary coil, E, through which and through the pivoted coil the current to be measured passes. One terminal of the coil E is connected to the post K, while the other is connected to the flexible conductor H, which in turn is connected to one of the terminals of the coil F, while the other terminal of the latter is connected to the flexible strip H' and exit binding-post L. The coil F is balanced on its bearings by the weight of the arm D' and piece D at one end and by a tension-spring, F', at the other. The axis A is in the shunt-circuit which is indicated by double-headed arrows in Fig. 7, and which contains the coils of the electric motor, and it is through the contact of the finger D with the mercury that this shunt-circuit is maintained. The passage of the main current through the coils E and F causes the latter coil to turn on its bearings, so as to depress the contact-piece D. The centrifugal force, on the other hand, lowers the surface of the mercury in the tube C. The theory is as follows: Let $w$ be the angular velocity of rotation in circular angular measure and seconds; $r$, the radius from the axis of rotation to the center of one of the outer tubes. Then, neglecting the diameters of the tubes in comparison with $r$, the difference of level of the mercury in the tubes will be $\dfrac{r^2 w^2}{2g}$ when $g$ is gravity. Now, if C be the current in the coils E F, the coil F turns from its neutral position through an angle proportional to $C^2$; hence the contact-pin D will move through an angle equal to $aC^2$ when $a$ is constant; hence the speed of the motor and governor will become such that $aC^2 = \dfrac{r^2 w^2}{2g}$, $w$ being alternately a little too great or a little too small; hence $w$ varies as C, and the whole quantity of electricity passed is proportional to the number of revolutions made. The revolutions of the shaft A may be transmitted to any suitable registering devices.

I claim as my invention—

1. In an electric meter, the combination of a rotating shaft, a centrifugal governor driven thereby, and measuring and recording devices actuated by the said shaft, with an electro-magnetic coil in the main circuit and controlling the speed of the governor, substantially as described.

2. In an electric meter, the combination of an electric motor in a shunt from the circuit to be measured, and a centrifugal governor driven by said motor, with measuring and recording devices and an electro-magnetic coil in the main circuit, and devices, substantially as described, whereby the strength of the electric current controls the speed of the motor.

3. In an electric meter, the combination of an electric motor in a shunt-circuit, a centrifugal governor driven by said motor, and contact-points in said circuit, with measuring and registering devices and an electro-magnetic coil in the main circuit, and devices, substantially as described, whereby variations in the strength of the current and speed of the governor cause the making and breaking of the shunt-circuit.

4. In an electric meter, the combination of a rotating shaft, a centrifugal governor driven thereby, and measuring and recording devices actuated by the said shaft, with an electro-magnetic coil and its core, through the center of which the said shaft passes, the said coil being in the main circuit and controlling the governor, substantially as set forth.

5. In an electric meter, the combination of a centrifugal governor, and an electric motor in a shunt-circuit actuating said governor, with an electro-magnetic coil having a movable half-core controlled by said governor, and a contact-point carried by said half-core to make and break the shunt-circuit.

In testimony whereof I have signed my name to this specification in the presence of two subscribing witnesses.

JOHN HOPKINSON.

Witnesses:
CHAS. MILLS,
J. H. JOHNS,
*Both of 47 Lincoln's Inn Fields, London.*